(12) United States Patent
Chen

(10) Patent No.: US 6,449,148 B1
(45) Date of Patent: Sep. 10, 2002

(54) SCROLL SWITCH

(75) Inventor: Ira Chen, Hsin-Tien (TW)

(73) Assignee: Shin Jiuh Corp., Taipei Hsien (TW)

( * ) Notice: Subject to any disclaimer, the term of this patent is extended or adjusted under 35 U.S.C. 154(b) by 69 days.

(21) Appl. No.: 09/779,519

(22) Filed: Feb. 9, 2001

(51) Int. Cl.[7] .............................. H05K 7/14; G06F 1/16
(52) U.S. Cl. ................. 361/686; 361/801; 361/837; 345/163
(58) Field of Search ................. 361/683, 686, 361/796, 801, 829, 837; 345/157, 163, 164; D14/402, 300

(56) References Cited

U.S. PATENT DOCUMENTS

| | | | | |
|---|---|---|---|---|
| 5,808,568 A | * | 9/1998 | Wu | 341/173 |
| 5,912,661 A | * | 6/1999 | Siddiqui | 345/157 |
| 6,014,130 A | * | 1/2000 | Yung-Chou | 250/221 |
| 6,097,371 A | * | 8/2000 | Siddiqui et al. | 345/156 |
| 6,097,964 A | * | 8/2000 | Nuovo et al. | 345/167 |
| 6,373,404 B1 | * | 4/2002 | Chou | 341/20 |

* cited by examiner

Primary Examiner—Jayprakash N. Gandhi
(74) Attorney, Agent, or Firm—Bacon & Thomas, PLLC

(57) ABSTRACT

An improved scroll switch includes a casing and an encoder mechanism. The casing has a housing chamber which is bordered by two walls which have respectively a bore formed thereon. One wall further has a snap aperture below the bore. The encoder mechanism has a cap which has a snap stub located at one side engageable with the snap aperture whereby the encoder mechanism is capable of fastening to the casing or be disassembled rapidly whenever desired.

6 Claims, 7 Drawing Sheets

PRIOR ART Fig. 1

SCROLL SWITCH

BACKGROUND OF THE INVENTION

This invention relates to an improved scroll switch and particularly a scroll switch that is capable of assembling and disassembling rapidly.

Many of the presently available mouse devices, notebook computers or handheld computers and keyboards have one or more roller means for users to control zoom in and zoom out of the viewing window or switching of the viewing pages. The means of using roller rotation to activate an encoded signal output may be seen as a scroll switch for switching window pages.

FIG. 1 illustrates a conventional scroll switch which generally includes a casing 9 and an encoder mechanism 2. The encoder mechanism 2 consists of a body 3, a press element 5, a rotary element 6 and a contact element 7. The press element 5, rotary element 6 and contact element 7 are assembled in the body 3, then the casing 9 is fastened to the body 3 at one side thereof. The casing 9 has arms 91 gripping the body 3 at two outer sides and bent for holding the press element 5, rotary element 6 and contact element 7 securely in the body 3. When in use, it can generate an encoded signal output under the driving of the rotating roller 10 to control the page switching of the windows.

As the arms 91 is bent to grip the body 3 at the outer sides, the bending of the arms 91 is a labor intensive operation and takes a lot of time. Once assembled, if there is malfunction or breakdown happened to the encoder mechanism 2, the arms 91 have to be bent in opposite direction for disassembling the casing 9 to replace the damaged parts and bent again for restoring the mechanism to operative condition. After repetitive bending, the arms 91 tend to lose the mechanical strength and unable to hold the casing 9 tightly, and may result in the press element 5, rotary element 6 and contact element 7 not being held securely in the casing 9. As a result, the scroll switch will have poor contact or generate fault encoding signal output and create mistaken page switching.

It also can happen that the arms 91 will be deformed or ruptured and broken after repetitive bending and result in damage of the casing 9. This will increase the cost.

SUMMARY OF THE INVENTION

In view of aforesaid disadvantages, it is therefore an object of this invention to provide an improved fastening means that enables the scroll switch be assembled and disassembled rapidly for increasing production yield.

Another object of this invention is to save assembly process and time, and to reduce production cost.

To attain the foregoing objects, the scroll switch according to this invention includes a casing which has a housing chamber bordered by two walls at two sides. Each wall has a bore and a fastening snap aperture located below the bore. The encoder mechanism may be disposed in the housing chamber and engage with the snap aperture through a snap stub formed on a cap of the encoder mechanism. Thus the encoder mechanism may be fastened to the casing rapidly. Likewise, the encoder mechanism may be disassembled quickly for repairs and maintenance.

BRIEF DESCRIPTION OF THE DRAWINGS

The invention, as well as its many advantages, may be further understood by the following detailed description and drawings.

DESCRIPTION OF THE PREFERRED EMBODIMENT

Figure 1:
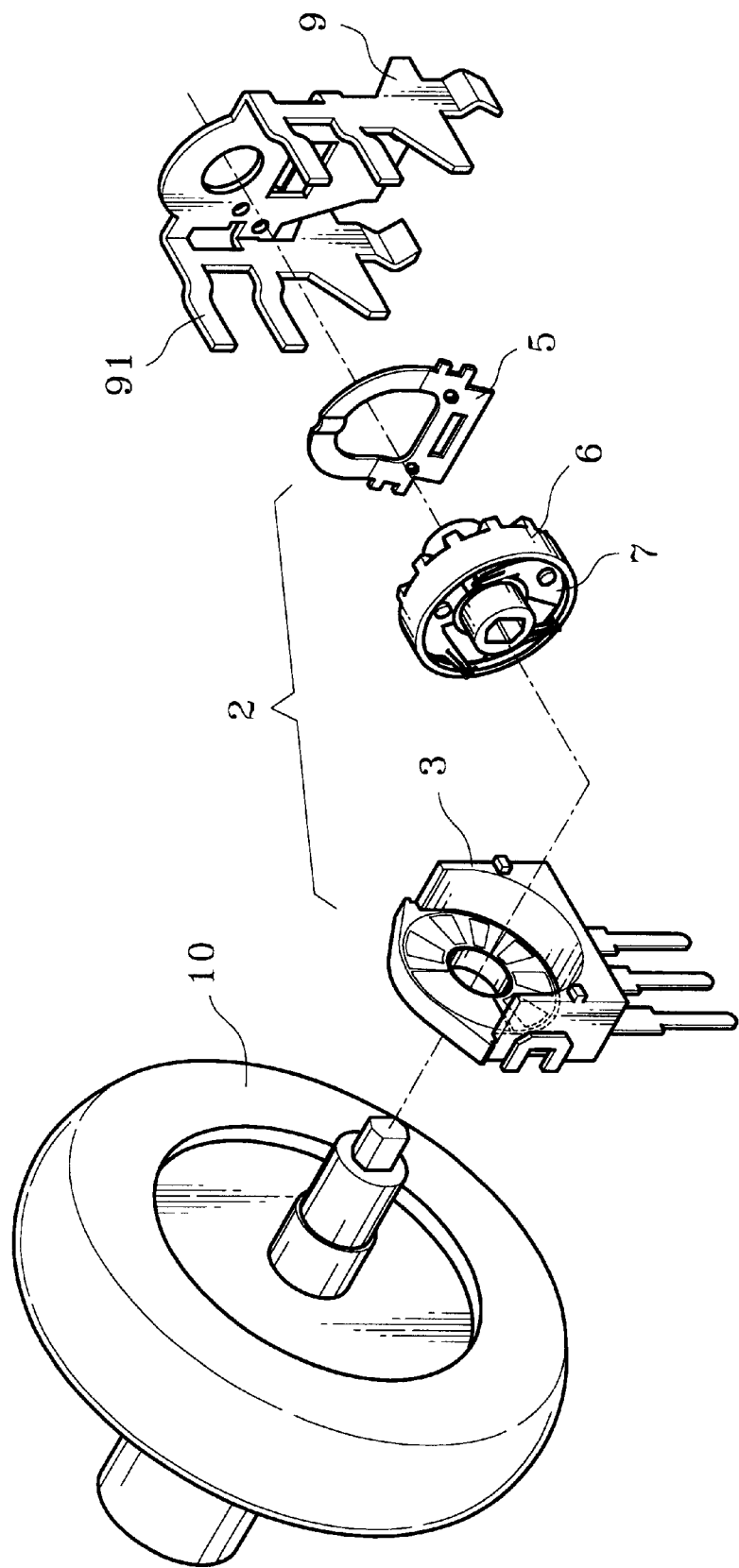
FIG. 1 is an exploded view of a conventional scroll switch.
Figure 2:
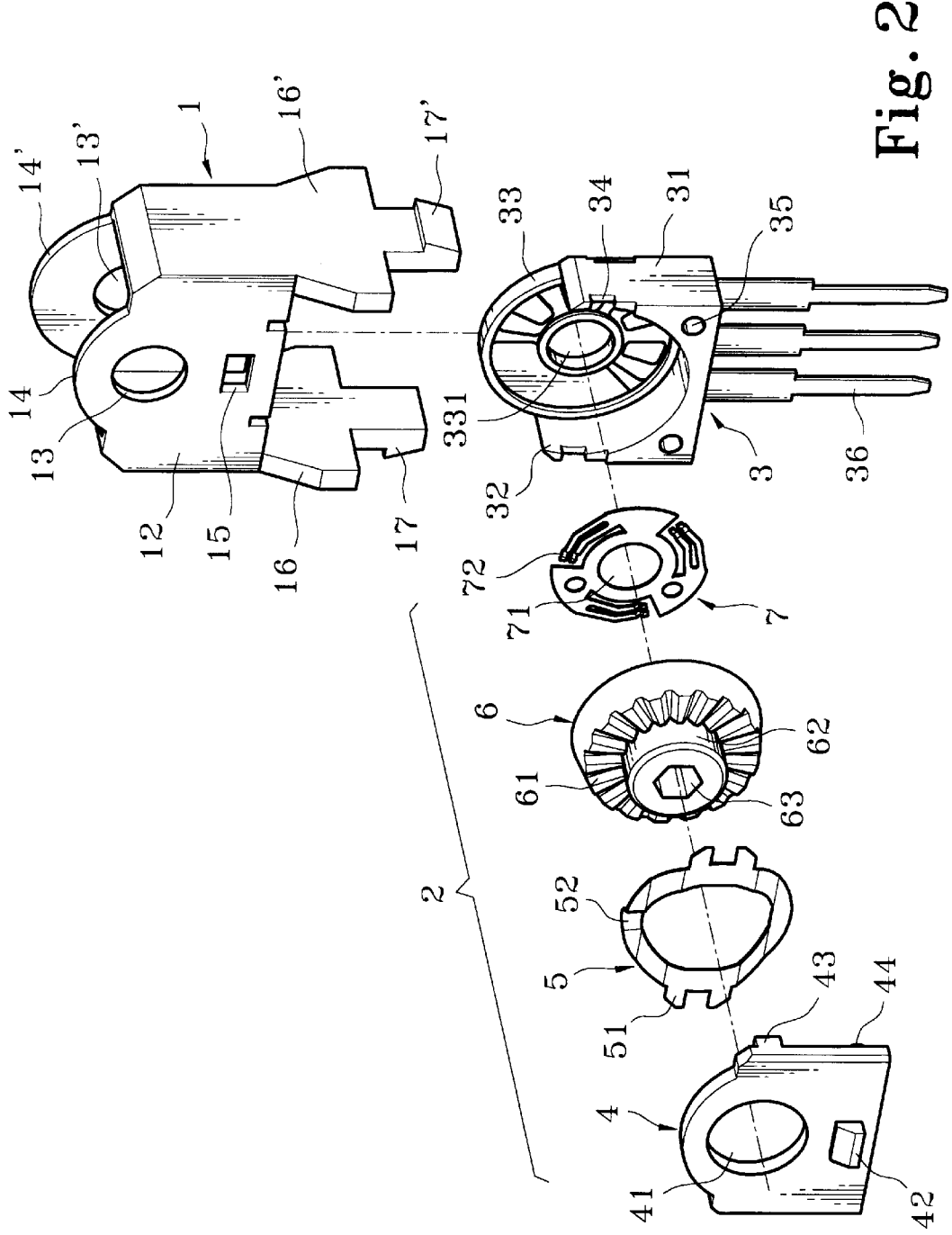
FIG. 2 is an exploded view of this invention.

Referring to FIG. 2, the scroll switch of this invention includes a casing 1 and an encoder mechanism 2 for use in a mouse device, notebook computer, handheld computer or keyboard and to be driven by a roller (not shown in the figure) to generate an encoded signal output. The computer processes the signal then performs window page switching operation to replace conventional window scrolling function.

The casing 1 has a housing chamber 11 which is bordered by two walls 12 at two sides. The walls 12 have respectively a first bore 13 and 13' for holding the spindle of the roller (not shown in the figure). The top edges of the walls 12 above the first bores 13 and 13' form respectively an arched rim 14 and 14' which have different heights. On the wall 12 below the first bore 13, there is a snap aperture 15. At two ends of the walls 12, there are two symmetrical supports 16 and 16' which extend downward to form a fastening foot 17 and 17'. The fastening foot 17 and 17' are used to engage with a circuit board (not shown in the figure) for the support 16 and 16' to hold the casing 1 on the circuit board securely.

The encoder mechanism 2 includes a body 3, a cap 4, a press element 5, a rotary element 6 and a contact element 7. The body 3 has frame 31 which forms an action space 32 therein. There is an encoder circuit 33 located at one side of the action space 32. The encoder circuit 33 has a second bore 331 for the roller spindle to pass through. At another side of the frame 31, there are snap notches 34 and fastening elements 35 located thereon. The frame 31 further has a set of leads 36 extended outward from one end for soldering to the circuit board.

The cap 4 has a third bore 41 for the roller spindle to pass through, a snap stub 42 located at one side for engaging with the snap aperture 15, and snap hooks 43 and struts 44 located at another side for engaging respectively with the snap notches 34 and fastening elements 35.

The press element 5 has two symmetrical lugs 51 located at two ends of the peripheral rim thereof for engaging with the snap hooks 43 and an anchor ridge 52 located at another end of the peripheral rim.

The rotary element 6 has a teeth surface 61, a hub 62 located in the center for holding the press element 5 at one side and a fourth bore 63 formed in the hub 62 for the roller spindle to pass through.

The contact element 7 is fastened to the rotary element 6 at another side opposite to the press element 5 and has a fifth bore 71 for the roller spindle to pass through and elastic strips 72 for contacting the encoder circuit 33 when driven by the rotating rotary element 6 thereby to generate an encoded signal which will be transmitted to the circuit board through the leads 36. The computer receives and processes the signal then controls the window page switching operation.

Figure 3:
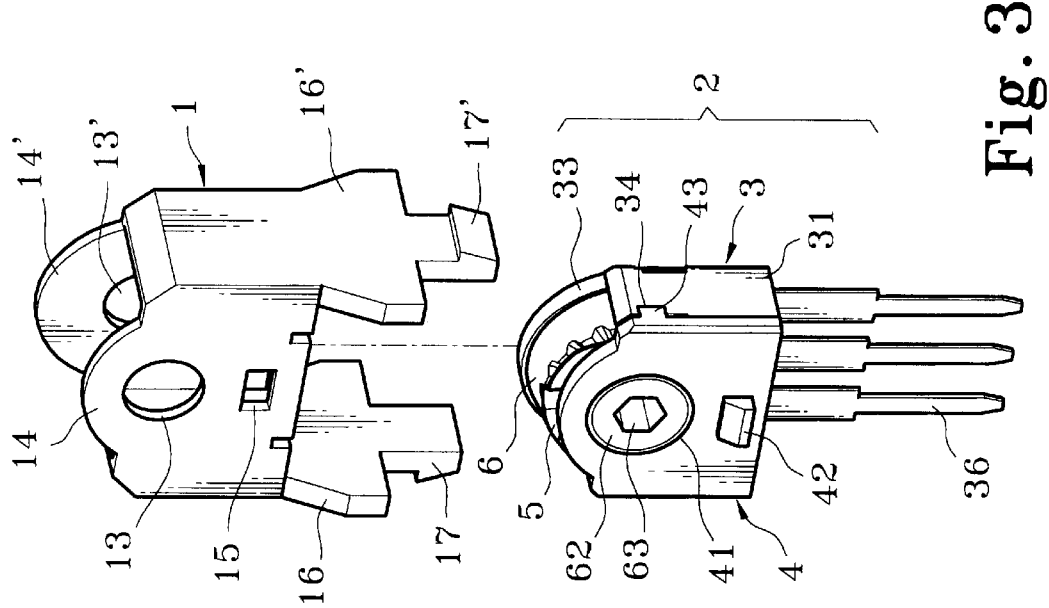
FIG. 3 is a perspective view of this invention, at a detached state.
Figure 4:
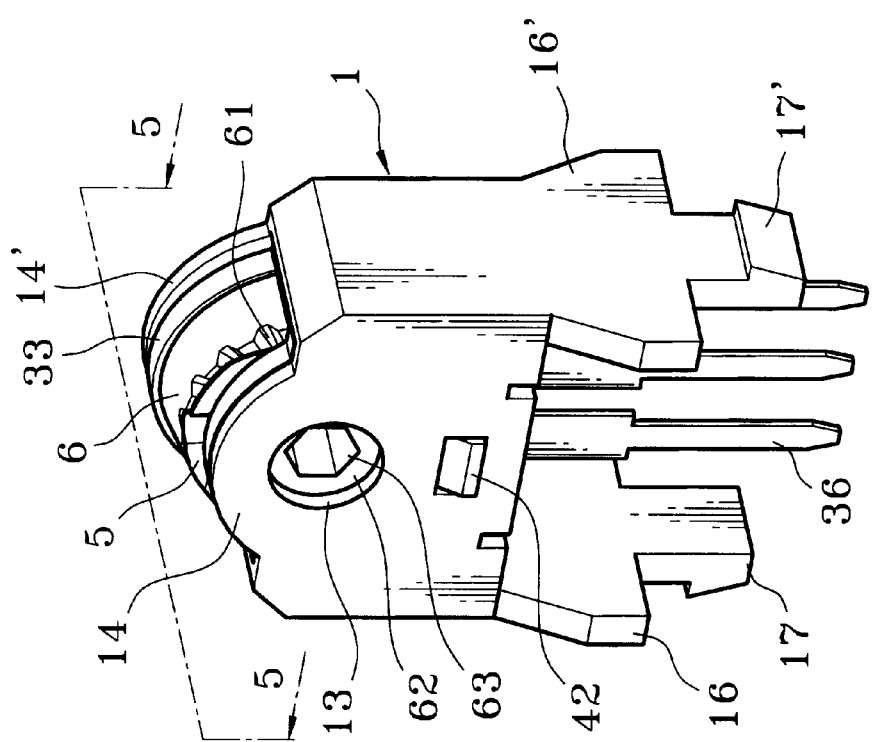
FIG. 4 is a perspective view of this invention.
Figure 5:
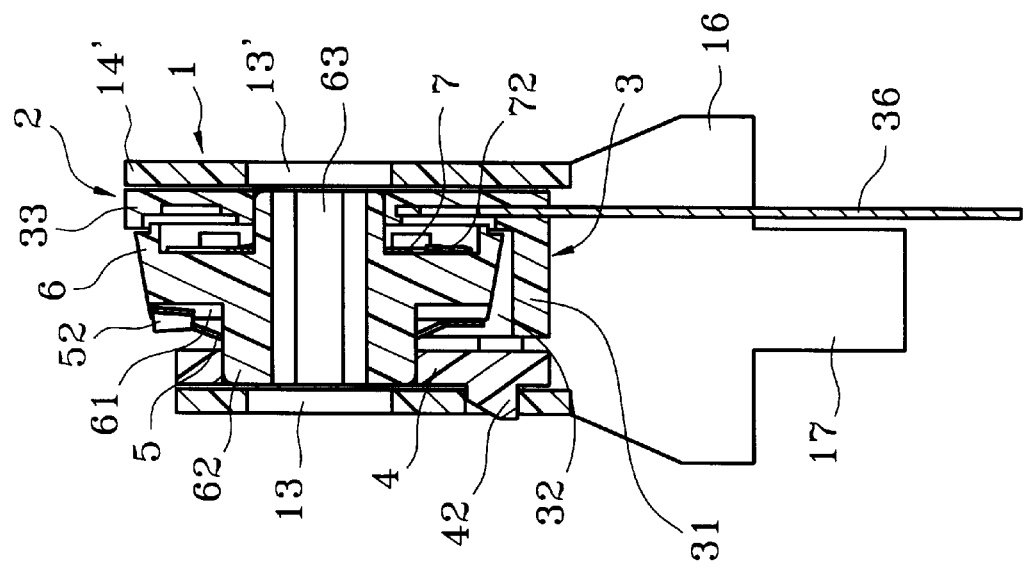
FIG. 5 is a cross sectional view of this invention, taken along line 5—5 in FIG. 4.

Referring to FIGS. 3, 4, and 5 for assembling of this invention, the press element 5, rotary element 6 and contact element 7 are assembled in sequence in the action space 32 of the body 3, and engage the cap 4 with the frame 31 of the assembled body 3 to complete the assembly of the encoder mechanism 2.

Then dispose the assembled encoder mechanism 2 into the housing chamber 11 of the casing 1 to make the snap stub 42 latching to the snap aperture 15 thereby to enable the encoder mechanism 2 housed and fastened rapidly in the casing 1. As a result, the press element 5, rotary element 6 and contact element 7 will be fastened together tightly so that the contact element 7 will contact the encoder circuit 33 firmly to generate accurate encoded signal under the driving of the rotating roller.

During assembly, if the encoder mechanism 2 has any malfunction or damage, the encoder mechanism 2 may be removed easily from the casing 1 by using a pointed object to press the snap stub 42 to disengage the same from the snap aperture 15. Disassembly of the encoder mechanism 2 and replacement of the parts may be done easily. Product defect thus may be reduced and production yield will be enhanced.

Figure 6:
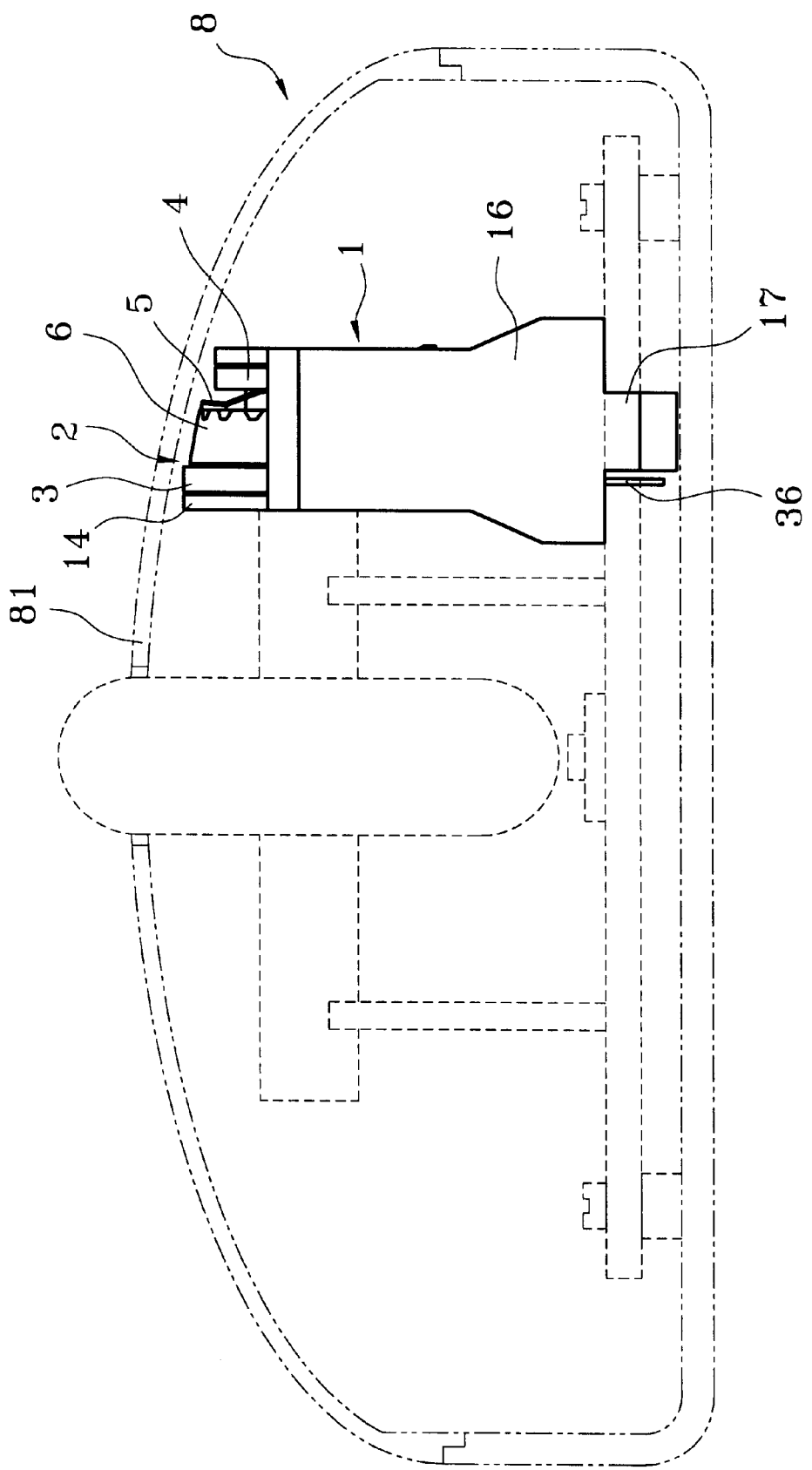
FIG. 6 is a schematic view of this invention in use.
Figure 7:
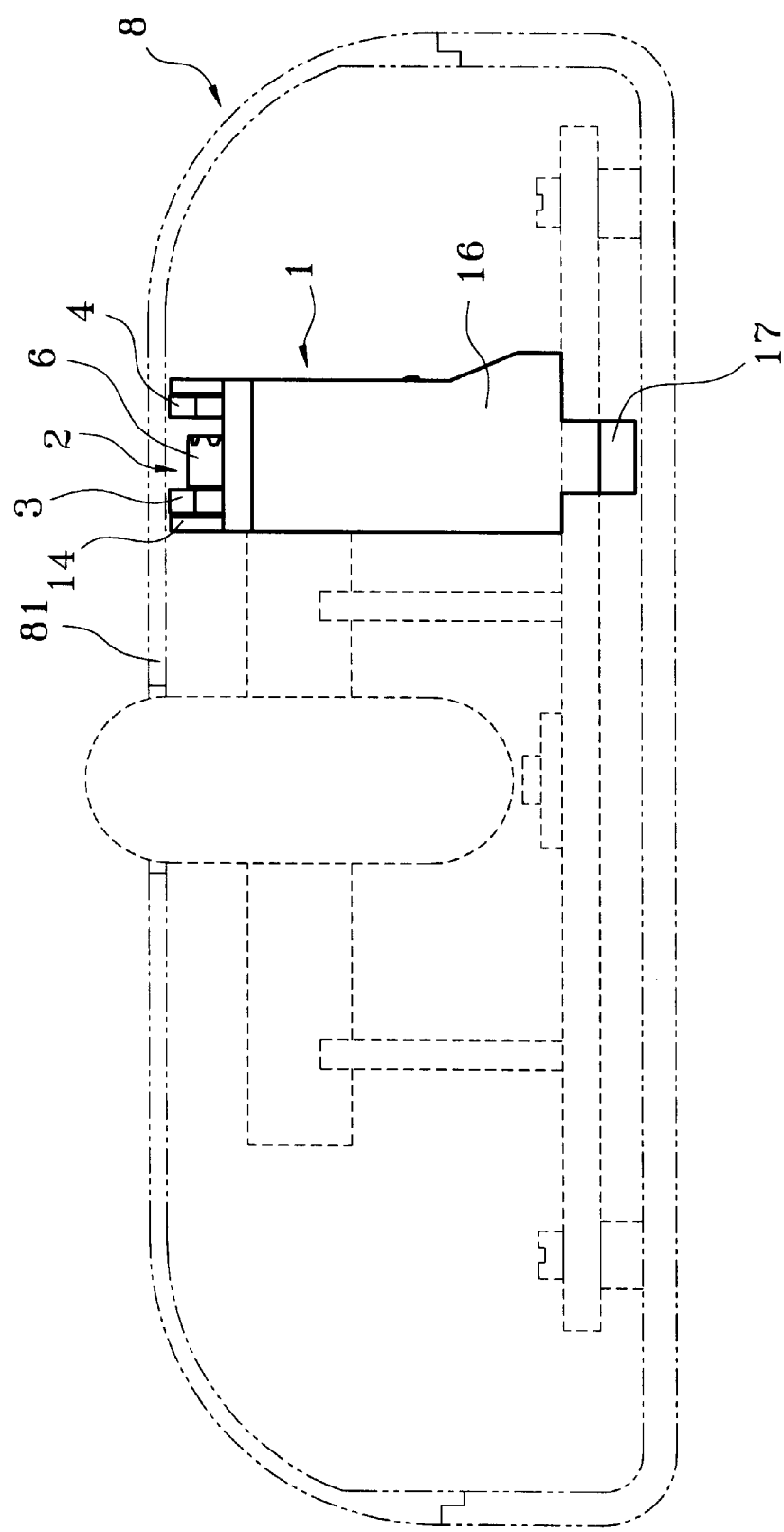
FIG. 7 is another schematic view of this invention in use.

FIGS. 6 and 7 show embodiments of this invention in use. When the scroll switch is located in a mouse and adjacent the button key 81 (left or right key), the arched rims 14 and 14' may be formed at different height levels to avoid interference of the downward movement of the button keys 81. When the downward displacement of the button key 81 is much higher than the scroll switch and with no interference concern, the arched rims 14 and 14' may be set at the same height level.

What is claimed is:

1. An improved scroll switch comprising an encoder mechanism housed in a casing to be disposed in a mouse device, notebook computer, handheld computer or keyboard and to be driven by a roller for actuating the scroll switch to generate an encoded signal output for the computer to process and control windows pages switching, wherein:

the casing has a housing chamber bordered by two walls at two sides thereof, the walls having respectively a first bore, one wall having a snap aperture located below the first bore; and the encoder mechanism includes a body, a cap, a press element, a rotary element and a contact element; the body having a frame which forms an action space therein and an encoder circuit located at one side of the action space; the cap having a third bore and a snap stub located at one side adjacent the third bore engageable with the snap aperture such that the encoder mechanism is capable of fastening to the casing or be disassembled rapidly.

2. The improved scroll switch of claim 1, wherein the walls have respectively an arched rim located above the first bores, the arched rim having same or different heights.

3. The improved scroll switch of claim 1, wherein the walls have two ends extended respectively to form symmetrical supports each being extended to form a fastening foot.

4. The improved scroll switch of claim 1, wherein the encoder circuit has a second bore formed therein for a roller spindle to pass through.

5. The improved scroll switch of claim 1, wherein the frame has a snap notch and a fastening element located thereon, and a set of leads extended outward from one end thereof.

6. The improved scroll switch of claim 1, wherein the cap has a snap hook and a strut located at another side thereof.

* * * * *